United States Patent [19]
Williams

[11] 3,835,368
[45] Sept. 10, 1974

[54] VOLTAGE REGULATOR FOR A DIRECT CURRENT POWER SUPPLY

[75] Inventor: James W. Williams, Lynchburg, Va.

[73] Assignee: General Electric Company, Lynchburg, Va.

[22] Filed: May 21, 1973

[21] Appl. No.: 362,269

[52] U.S. Cl............ 323/17, 323/22 T, 323/DIG. 1
[51] Int. Cl............................................. G05f 1/56
[58] Field of Search.......... 323/4, 9, 17, 20, DIG. 1, 323/22 T

[56] References Cited
UNITED STATES PATENTS
3,510,755  5/1970  Gerard et al.................. 323/DIG. 1
3,530,368  9/1970  Gerard............................ 323/22 T

*Primary Examiner*—Gerald Goldberg

[57] ABSTRACT

Unregulated direct current is supplied to output terminals through the emitter-collector path of a transistor that is switched on and off by a bistable multivibrator. The multivibrator is periodically set by periodically recurring set pulses to turn the transistor on and supply direct current. The multivibrator is reset by a voltage sensing circuit which produces a reset pulse to turn the transistor off in response to the voltage at the output terminals reaching a selected magnitude.

1 Claim, 2 Drawing Figures (a) SET PULSES
(b) OUTPUT VOLTAGE — THRESHOLD
(c) RESET PULSES

TIME →

VOLTAGE REGULATOR FOR A DIRECT CURRENT POWER SUPPLY

BACKGROUND OF THE INVENTION

My invention relates to a direct current voltage regulator, and particularly to a direct current voltage regulator which interrupts or chops the direct current in order to regulate the output voltage.

Direct current voltage regulators operated by he interruption or chopping technique have been utilized in many applications. As far as I am aware, the interruption or chopping rate has been a function of many variables which cannot be precisely controlled. For example, some regulators have utilized saturable core devices which have widely varying characteristics. Such characteristics do not readily adapt themselves to permitting the chopping rate to be synchronized with an external frequency. However, in some applications, the interruption or chopping rate should or must be synchronized with an external frequency in order to prevent the radio frequency energy generated by the switching transients from interfering with the radio frequencies in a communications band. The frequency for synchronization is chosen to make the energy of the chopper occupy a spectrum outside the communications band.

Accordingly, a primary object of my invention is to provide a new and improved direct current voltage regulator which utilizes the interruption or chopping technique.

Another object of my invention is to provide an improved direct current voltage regulator which permits the voltage to be interrupted or chopped, and hence regulated, as a function of an external frequency.

SUMMARY OF THE INVENTION

Briefly, these and other objects are achieved in accordance with my invention by a transistor switch having its emitter-collector path connected between the input for unregulated direct current and the output for the voltage regulated direct current. A bistable multivibrator has its output connected to the base of the transistor, and switches the transistor into conduction and non-conduction in response to the multivibrator being set and reset. Periodically recurring set pulses are applied to the multivibrator set input to cause the transistor to conduct direct current in response to each pulse. The multivibrator is reset as a function of the output voltage sensed by a sensing circuit connected to the regulated direct current output terminals. Each time this output voltage reaches a selected magnitude or threshold, the multivibrator is reset to cause the transistor to stop conducting. Thus, the path provided by the transistor is interrupted or chopped as a function of the set pulse rate frequency, a feature that is desirable in many applications.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
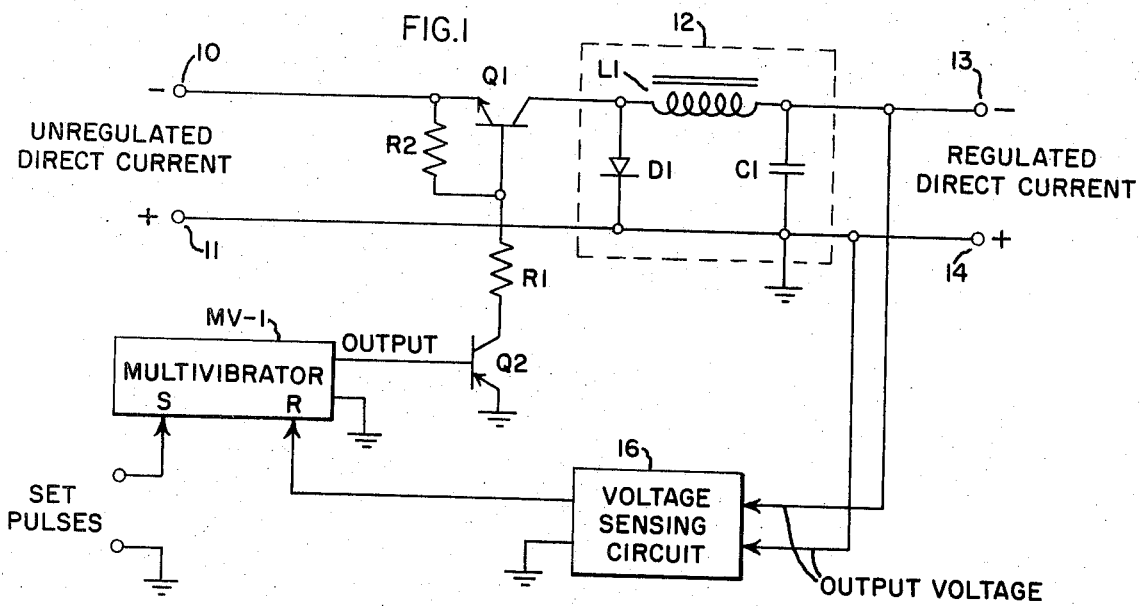
FIG. 1 shows an electrical circuit diagram of one embodiment of an improved direct current voltage regulator in accordance with my invention.

In the embodiment of FIG. 1, I have assumed that the nature of the application requires that the positive polarity of the direct current be connected to a point of reference potential or ground as shown. However, persons skilled in the art will appreciate that my invention can also be used in applications requiring that the negative polarity be grounded. An unregulated direct current source has its negative terminal connected to a negative input terminal 10 and its positive terminal connected to a positive input terminal 11. The input terminal 10 is connected to the emitter of an NPN type transistor Q1. The collector of the transistor Q1 is connected through a filter, generally designated by the dashed line rectangle 12, to a negative output terminal 13. In this embodiment, I have assumed that the filter 12 comprises a series inductor L1 and a shunt capacitor C1. I also provide a diode D1 to provide a path for inductive current to flow when the transistor Q1 is turned off. The positive input terminal 11 is connected directly to a positive output terminal 14. With respect to the circuit as described thus far, direct current can be supplied to the output terminals 13, 14 when the emitter-collector path of the transistor Q1 is conductive or closed, but cannot supply direct current when this emitter-collector path is open or interrupted.

The state of the emitter-collector path of the transistor Q1 is determined by signals supplied to its base. The base is connected through a resistor R1 to the collector of a control or isolating transistor Q2, which is of the PNP type. The emitter of the transistor Q2 is connected to ground. The base of the transistor Q2 is connected to the output terminal of a bistable multivibrator MV-1. The multivibrator MV-1 may be any of the known bistable types which have two inputs for signals to cause the multivibrator output to change state or voltage. These inputs are designated S (for set) and R (for reset). When a signal is applied to the set input S, the output of the multivibrator MV-1 has a negative voltage state that causes the transistor Q2 to be turned on. This causes a relatively positive voltage to be applied to the base of the transistor Q1 and turn the transistor Q1 on. Thus, current can flow between the input terminal 10 and the output terminal 13. When, however, a signal is applied to the reset input R of the multivibrator MV-1, the output of the multivibrator MV-1 has a zero voltage state that causes the transistor Q2 to be turned off. This removes the relatively positive voltage from the base of the transistor Q1. A resistor R2 connected between the emitter to the collector of the transistor Q1 can supply a negative voltage to the base so that the transistor Q1 is turned off. The multivibrator MV-1 is periodically set and the transistor Q1 turned on by set pulses which periodically recur. The multivibrator MV-1 may be reset by pulses supplied by a voltage sensing circuit 16. The voltage sensing circuit 16 may be any of the known types of voltage sensing circuits having a reference voltage for setting a threshold, and providing a pulse output when the applied voltage magnitude exceeds this threshold level. Each of these pulses is produced when the voltage sensing circuit 16 senses that the output voltage, specifically the voltage across the capacitor C1, exceeds a selected threshold or magnitude. Thus, each set pulse causes the transistor Q1 to conduct and supply direct current. When the output voltage reaches a selected magnitude, the voltage sensing circuit 16 supplies a reset pulse which turns the transistor Q1 off, and interrupts or chops the direct current. This operation will be explained in greater detail with respect to the wave form shown in FIG. 2.

Figure 2:
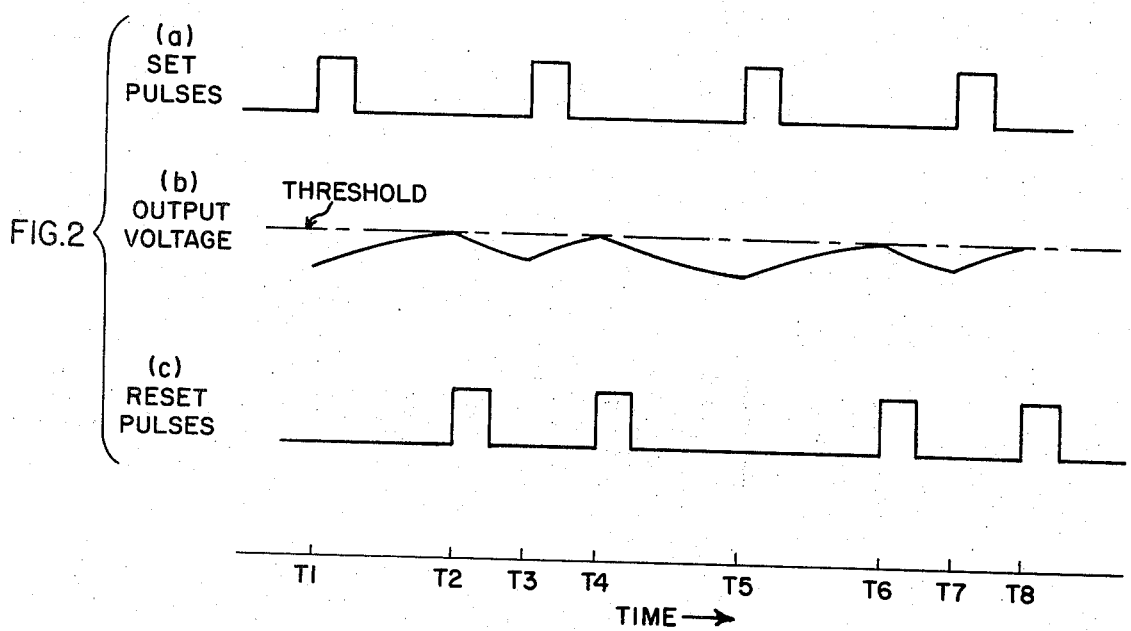
FIG. 2 shows wave forms illustrating the operation of my circuit of FIG. 1.

In FIG. 2, I have shown the periodically recurring set pulses in FIG. 2a, an assumed output voltage in FIG. 2b, and the reset pulses in FIG. 2c. All of these wave forms are plotted against a common time axis. At the time T1, a set pulse is supplied. This sets the multivibrator MV-1, and its output turns the transistor Q2 on. This, in turn, turns the transistor Q1 on so that direct current may be supplied to the output terminal 13. This direct current charges the capacitor C1 as indicated by the exponential curve in FIG. 2b. When the output voltage across the capacitor C1 reaches the threshold level shown by the dashed and dotted line in FIG. 2b, the voltage sensing circuit 16 produces an output pulse. This occurs at the time T2. The voltage sensing circuit 16 produces a reset pulse, which causes the multivibrator MV-1 to be reset. This turns the transistor Q2 off, so that the relatively positive voltage is removed from the base of the transistor Q1, and the transistor Q1 is also turned off. The output voltage across the capacitor C1 begins to decrease exponentially until the time T3, at which time another set pulse occurs. This restarts the cycle, namely setting the multivibrator MV-1, turning the transistor Q2 on, and turning the transistor Q1 on. Thus, the output voltage begins to rise exponentially. It will be noted that at the time T3, the output voltage did not decrease to the same low value as when it had at the time T1. This is because I have assumed that the load conditions were such that the output voltage took a relatively long period of time to reach the threshold, and this left a relatively short time (that is between the times T2 and T3) for the output voltage to decrease. Hence, when the output voltage began to increase again at the time T3, it required a shorter length of time to reach the threshold level. This occurs at the time T4, when another reset pulse is produced. The transistor Q1 is turned off and the output voltage begins to decrease exponentially until the time T5 when another set pulse occurs. The transistor Q1 is turned on again and the output voltage increases until the threshold level is reached at the time T6. The transistor Q1 is turned off and the output voltage decreases until the occurrence of another set pulse at the time T7. Another reset pulse is produced at the time T8, and the operation continues in a similar manner, depending upon the exact load conditions.

It will thus be seen that I have provided a new and improved direct current voltage regulator which utilizes pulses having any desired rate. Since these pulses determine the time the transistor Q1 is turned on, and hence the energy spectrum of the resulting transients, the rate of these pulses can be set to provide the best energy spectrum characteristics (which is usually one causing the least interference). Thus, my circuit operates at this desired pulse rate, and does not depend on other variables, such as the saturation characteristics of a magnetic core. While I have shown only one embodiment, persons skilled in the art will appreciate that modifications may be made. For example, the voltage sensing circuit 16 may take various forms. The transistor Q1 may be of the PNP type or the positive terminals may be grounded if the circuit polarities are observed. And, the isolating transistor Q2 may be omitted and the multivibrator output connected to the transistor Q1 if the multivibrator output has the proper voltage. Therefore, while my invntion has been described with reference to a particular embodiment, it is to be understood that modifications may be made without departing from the spirit of the invention or from the scope of the claims.

What I claim as new and desire to secure by letters Patent of the United States is:

1. An improved voltage regulator for a direct current power supply comprising:
   a. a pair of input terminals adapted to be connected to a unregulated source of direct current;
   b. a pair of output terminals for supplying regulated direct current;
   c. a transistor having an emitter and a collector forming a path, and having a base;
   d. means connecting one end of said emitter-collector path of said transistor to one of said input terminals;
   e. a filter circuit connected between the other end of said emitter-collector path of said transistor and one of said output terminals, said filter circuit comprising at least a shunt capacitor connected across said output terminals;
   f. means connecting the other input terminal to the other output terminal;
   g. a bistable multivibrator having a set input, a reset input, and an output which produces a first voltage in response to a set pulse applied to said set input and which produces a second voltage in response to a reset pulse applied to said reset input;
   h. means connected to said set input for applying a periodically recurring set pulse to said set input;
   i. voltage sensing means connected between said output terminals and said multivibrator reset input for applying a reset pulse to said reset input in response to the voltage across said output terminals reaching a predetermined magnitude;
   j. and means connecting said multivibrator output to said base of said transistor for rendering said emitter-collector path conductive in response to said first voltage and for rendering said emitter-collector path non-conductive in response to said second voltage.

* * * * *